(No Model.) 2 Sheets—Sheet 1.
W. B. CARPENTER.
Process of, and Apparatus for, Molding Hollow Forms of Celluloid or like Plastic Material.
No. 237,168. Patented Feb. 1, 1881.
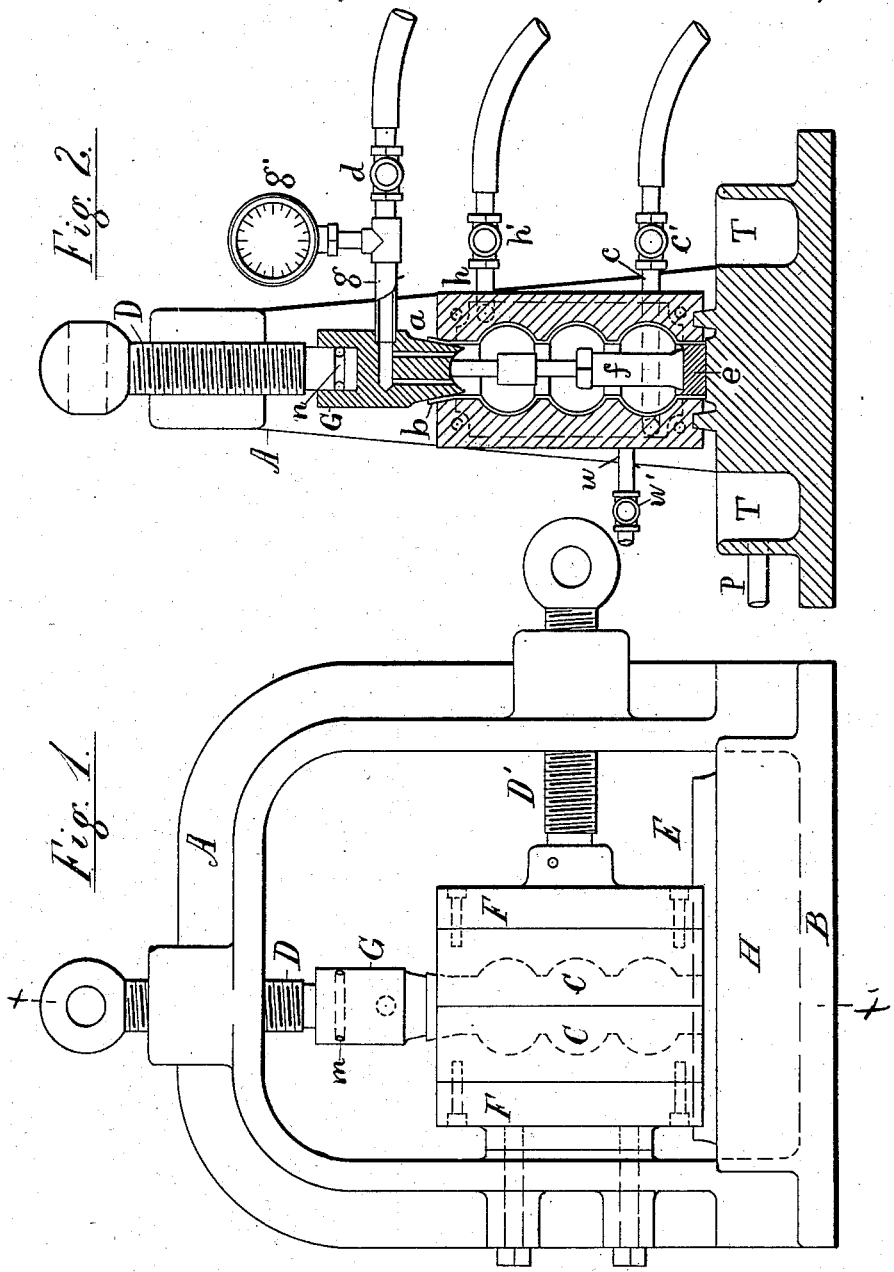
Attest:
Joseph H. Eno
Wm. L. Fish
Inventor:
William B. Carpenter
By Howard Harris
Atty (No Model.) 2 Sheets—Sheet 2.
W. B. CARPENTER.
Process of, and Apparatus for, Molding Hollow Forms of Celluloid or like Plastic Material.
No. 237,168. Patented Feb. 1, 1881.
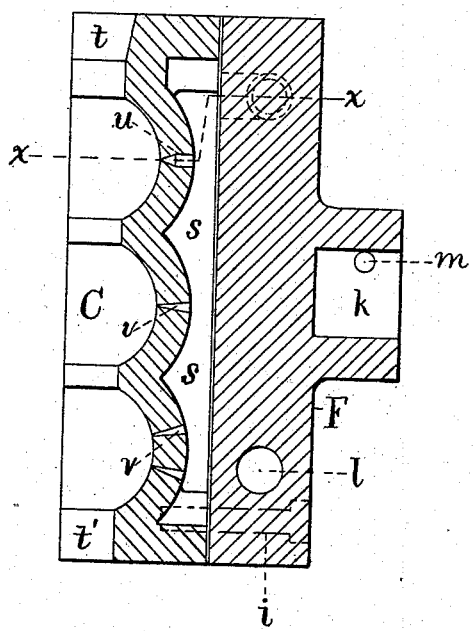
Fig. 3.
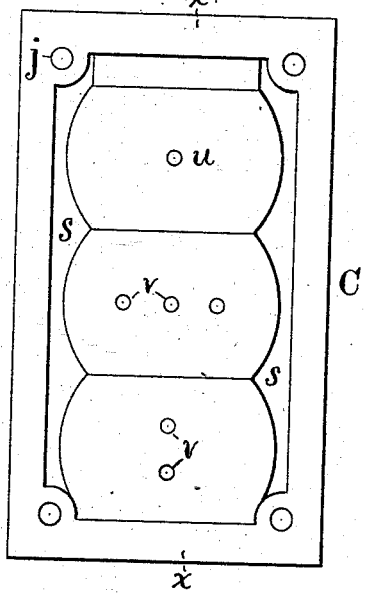
Fig. 4.
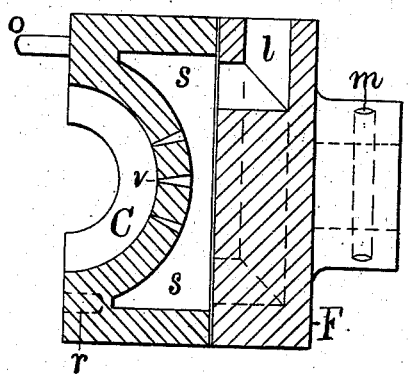
Fig. 5.
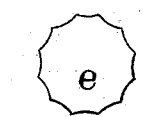
Fig. 6.
Fig. 7.
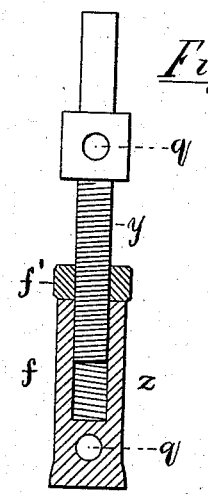
Fig. 8.
Attest:
Joseph H. Ems
Wm L. Fish
Inventor.
William B. Carpenter
By Horace Harris
Atty

UNITED STATES PATENT OFFICE.

WILLIAM B. CARPENTER, OF NEWARK, NEW JERSEY, ASSIGNOR TO CELLULOID NOVELTY COMPANY AND CELLULOID MANUFACTURING COMPANY, OF NEW YORK, N. Y.

PROCESS OF AND APPARATUS FOR MOLDING HOLLOW FORMS OF CELLULOID OR LIKE PLASTIC MATERIAL.

SPECIFICATION forming part of Letters Patent No. 237,168, dated February 1, 1881.

Application filed May 28, 1880. (No model.)

*To all whom it may concern:*

Be it known that I, WILLIAM B. CARPENTER, of Newark, in the county of Essex and State of New Jersey, have invented a new and useful Improvement in the Process of and Apparatus for Molding Hollow Forms of Celluloid or like Plastic Material, of which the following is a specification.

My invention relates to an improvement in the manufacture of plastic materials; and it consists, first, in an improved process for molding hollow articles from a blank tube of any substance that is rendered plastic by heat, as celluloid or similar plastic material; second, in an improved machine for performing the said process; third, in forming the dies or molds with hollow backs for the circulation of the heating and cooling fluids; fourth, in the formation of conical openings in the recesses of the molds for venting the same; fifth, in the combination of a fluid-conductor with the plugging device; sixth, in the combination, with the plugging device, of an internal mandrel and elastic stopper; seventh, in the connection of a pressure-gage with the interior of the molded article; and, eighth, in the combination of hot and cold water pipes with the die-beds.

My invention is applicable to the molding of dolls' heads, vases, and articles of irregular shape, and is shown in the drawings as applied to the molding of ladies' powder-boxes, three of which are shown connected together as molded, and are afterward provided with bottoms by a separate process.

My molding process consists in the following operations: first, in clamping a piece of tube in a separable die; second, in providing each end of the tube with a plug or stopper adapted to be tightened by degrees; third, in circulating steam or hot water entirely through the tube conjointly with the heating of the dies by a circulation in their interior; fourth, in tightly stopping the ends of tube when at the proper temperature and applying an internal pressure to force the tube into the mold; fifth, in checking and holding the pressing-fluid within the mold when the proper pressure is indicated by the gage; and, sixth, in circulating a cooling-fluid in the backs of the dies or mold parts to harden the molded article in the desired shape.

The mechanism for this purpose consists of a press and molds of special construction, Figures 1 and 2 showing the former in side elevation and in vertical section on line $x\,x$, Fig. 1. Fig. 3 is a vertical section of a mold and die-bed on line $x\,x$ in Fig. 4, and Fig. 4 is a view of the back of one of the molds. Fig. 5 is a section on line $x\,x$ in Fig. 3; Fig. 6, a plan, and Fig. 7 an edge view, of the elastic stopper; and Fig. 8, a longitudinal section of the mandrel $f$, with the screw $y$ in its place.

A is the arch of the press, sustaining the nuts through which the pressing-screws operate. B is the bed of the press, to which the arch may be cast or bolted, as preferred. C are the dies or parts of the mold. D is the screw to operate the plugging device; D', the screw to clamp the dies together; E, the ribs on bed to carry the dies and die-beds; F, the die-beds to which the dies are bolted; G, the plugging-cone, swiveled upon the point of screw D, and provided with apertures $a\,a$, leading from the lower end to a pipe, $g$, for conducting steam or water into the tube $b$. $g'$ is a gage applied to the pipe $g$ to indicate the pressure in the tube or mold. $d$ is a cock in pipe $g$ to regulate the flow. $h$ and $c$ are hot and cold water pipes, provided with cocks $h'$ and $c'$; and $w$ is a waste-pipe to allow a circulation through the dies when desired; $w'$, the cock in the same. $e$ is an elastic stopper placed in the lower end of the tube before inserting it in the dies, and $f$ a mandrel to compress and expand the same as the plug G is gradually closed. This mandrel is also inserted in the tube with the stopper $e$, and the lower end of plug G is hollowed to fit the rounded top of the mandrel, and forces it downward upon the stopper $e$, which is made a little small for the tube, or with indented edges, as shown in Fig. 6.

The dies C are shown of similar and opposite form as the article shown, (a powder-box is of circular shape;) but the dies may be made of any desired shape, and are hollowed out or formed with spaces $s$ in their back for the circulation of water or steam.

The die-beds F are shown of rectangular shape, and the dies are bolted to their opposed faces by screws $i$, inserted through the beds into holes $j$, tapped into the backs of the dies.

Holes $l$ are shown in Figs. 3 and 5 for the insertion of the various connecting-pipes, and by which the fluids are conducted into the spaces $s$ behind the dies. The operation of the dies is effected by securing one of the die-beds to the arch A at one side of the press, and the other to the point of the pressing-screw D' exactly opposite. The die-bed is provided with a socket, $k$, upon its back, into which the point of the screw is swiveled, like the screw D in the plug G, by a pin, $m$, and groove $n$ in the point or neck of the screw. The dies being fitted (or the die-beds, if preferred) to the ribs E upon the bed of the press, they are guided steadily to and fro in their opening and closing, and they may also be provided with dowels $o$, to fit holes $r$ in the face of the opposite die.

The process of making a hollow article with this mechanism is as follows: The dies are separated and the cock $h'$ opened to admit hot fluid, which circulates behind the backs of both dies and passes out at the waste-pipe $w$. The tube $b$, from which the object is to be molded, is used of cylindrical, tapering, or any desired shape that can be produced without the aid of my apparatus, and is adapted to nearly fit the apertures $t\ t'$ at the top and bottom of the dies. (See Fig. 3.) The elastic stopper is inserted in the bottom of the tube and the mandrel $f$ placed upon it, with its upper end extending nearly to the top of the tube, which is then put in its place in the press and the dies closed upon it. The plug G is then forced into the upper end of the tube by its screw D, and the force employed is not sufficient to make a water-tight joint at the point of contact, so that the fluid introduced through the pipe $g$ is at liberty to escape and make room for a fresh supply. The shape of the stopper $e$ also permits the circulation of the steam or hot water introduced through the whole length of the tube by allowing a leakage at the bottom joint. This leakage at top and bottom of the tube is caught in tanks T, applied to the sides of the bed B, and shown in the drawings as cast in one piece therewith, a pipe, P, conducting the liquid to a sewer, as desired. The tube is thus heated and softened simultaneously with the heating of the dies, and the plug G is then forced down farther into the tube to close the same tightly at the top by its conical shape, and at the bottom by the expansion of the elastic stopper $e$ under the pressure exerted upon the top of the mandrel $f$. To secure the right adjustment of this mandrel I construct it with a threaded socket, $z$, near the bottom and insert therein a screw, $y$, (see Fig. 8,) provided with a jam-nut, $f'$. By inserting a rod in the holes $q$, formed in the screw and socket $z$, the length of the mandrel can be altered to suit a great variety of dies and adjusted to suit the wear of the stopper $e$, which is preferably made of india-rubber.

The pipe $g$ is preferably connected with a steam-boiler, as the primary heat and ultimate pressure required are thus secured without the use of any force-pump, and the boiler-pressure is thus exerted in the tube $b$, when its ends become water-tight.

The gage $g'$ indicates when the pressure reaches the maximum desired, and the cock $d$ is then closed and the circulation in the backs of the dies changed from hot to cold, to harden the molded article while under tension in the dies.

The condensation of the fluid from the pipe $g$ suffices to fill the pipe with water when being heated, and the pressure in the interior of the tube is thus maintained while it is cooling, even if the cock $d$ is closed. If desired, this cock may be left open to maintain a supply until the cold circulation has had the desired effect, the temperature of the dies serving to reduce the contents of the tube to its own level of heat in spite of its connection to the boiler.

When the molded article is chilled it may be taken from the dies by opening the same, and retains perfectly its form and any ornamentation that may be engraved within the dies.

To permit the escape of air or water from the dies, I find it desirable to furnish vents in the bottom of the deepest recesses, as at $u$ and $v$ in Fig. 3. These require to be very minute to prevent the penetration of the molded material, and I therefore give them a conical form, with their base at the back of the mold and their apex entering the recesses to be vented. By the use of these holes the hot water or steam first circulated to heat the dies is thrown into the die outside the tube and aids materially in heating the tube uniformly, while the holes afford a free escape for it under the pressure of the tube expanding to fill the mold.

In some instances the mandrel $f$ may be dispensed with, as in molding tubes having one end closed, as umbrella-handles.

From the above description it will be seen that my process is partly independent of the mechanism I have described, as the mold may be clamped together by screws independently of the press A B D' and supplied with the heating and cooling influences in a series of machines, instead of a single one provided with all the needful appliances. I do not, therefore, limit myself to the precise construction and arrangement of the parts I have described; but

I claim as follows:

1. The method herein described for forming hollow articles from a blank tube of celluloid or similar plastic material by heat and pressure applied to its interior in suitable molds.

2. In a machine for forming hollow articles of celluloid or similar plastic material, the frame A B, screws D D', die-beds F F, and plug G, operating in combination with the dies C C, substantially as shown and described.

3. The conical apertures $u\,v$, in combination with the recesses in the dies C, and connected with the spaces $s$ or suitable outlets for the vented fluids.

4. In combination with the movable plug G, the inlet-pipe $g$ and one or more apertures, $a$, for supplying the interior of the tube $b$, as desired.

5. The combination of the plug G with the mandrel and expansive stopper, as and for the purpose set forth.

6. In combination with the plug for conducting the desired pressure to the interior of the tube $b$, the boiler or other reservoir of pressure, and the gage $g'$, as and for the purpose described.

WILLIAM B. CARPENTER.

Witnesses:
 HORACE HARRIS,
 JOSEPH A. ENO.